United States Patent
Jung

(10) Patent No.: US 7,324,874 B2
(45) Date of Patent: Jan. 29, 2008

(54) AIR CONDITIONER FOR PROVIDING WELL-BEING INDEX

(75) Inventor: Il Dong Jung, Busan (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/314,015

(22) Filed: Dec. 22, 2005

(65) Prior Publication Data
US 2006/0161305 A1      Jul. 20, 2006

(30) Foreign Application Priority Data
Dec. 23, 2004   (KR)   ............... 10-2004-0111189

(51) Int. Cl.
*G01M 1/38* (2006.01)
*G05D 23/00* (2006.01)

(52) U.S. Cl. .............. 700/276; 700/299; 236/44
(58) Field of Classification Search ........... 700/276, 700/278, 299, 300
See application file for complete search history.

(56) References Cited

U.S. PATENT DOCUMENTS

| | | | | |
|---|---|---|---|---|
| 5,170,935 A | * | 12/1992 | Federspiel et al. | 236/44 C |
| 5,436,852 A | * | 7/1995 | Kon | 700/276 |
| 6,216,956 B1 | * | 4/2001 | Ehlers et al. | 236/47 |
| 6,934,862 B2 | * | 8/2005 | Sharood et al. | 713/300 |
| 6,997,390 B2 | * | 2/2006 | Alles | 236/49.4 |
| 2004/0060305 A1 | * | 4/2004 | Singh et al. | 62/126 |
| 2005/0096797 A1 | * | 5/2005 | Matsubara et al. | 700/291 |

* cited by examiner

*Primary Examiner*—Zoila Cabrera
*Assistant Examiner*—Nate Laughlin
(74) *Attorney, Agent, or Firm*—Birch, Stewart, Kolasch & Birch, LLP

(57) ABSTRACT

Air conditioner including a temperature sensor for sensing a room temperature, a humidity sensor for sensing room humidity, a control unit for controlling to calculate well-being indices according to the room temperature or the room humidity sensed at the temperature sensor and the humidity sensor with reference to well-being index calculating data stored already, and to present the well-being index calculated thus, and well-being index related information corresponding to the well-being index, and output means for presenting the well-being index calculated thus, and the well-being index related information corresponding to the well-being index under the control of the control unit, thereby readily calculating well-being indices and providing information thereof by using an air conditioner provided to houses or offices without exception without requiring any extra equipment.

13 Claims, 2 Drawing Sheets

AIR CONDITIONER FOR PROVIDING WELL-BEING INDEX

CROSS-REFERENCE TO RELATED APPLICATION

This application claims the benefit of Korean Application No. P2004-111189, filed on Dec. 23, 2004, which is hereby incorporated by reference as if fully set forth herein.

BACKGROUND OF THE INVENTION

1. Field of the Invention

The present invention relates to air conditioners, and more particularly, to an air conditioner which provides well-being indices with reference to a room temperature and/or room humidity for management of health of a user and room environment.

2. Discussion of the Related Art

Well-being is a word which emphasis on a 'quality of life' in a sense of living a healthy life.

Recently, there are increasing numbers of people who take a balanced life as an index of happiness of life in which mental and physical health is maintained, rather than a life only running forward for getting materialistic value or fame.

Such a well-being culture is known as a style of life taken place as people accept naturalism, new age culture, and the like against a highly developed civilization following improvement of a living standard.

While interest on health of individual is emphasized the most than any other times, for effective management of personal health and room environment, it is required to provide information required for activity and life of a person in the room.

Of the information, a food poisoning index, a discomfort index, a putrefaction index, and so on is required, which is sensitive to a temperature, and humidity.

At first, the food positioning index will be reviewed.

In general, the food poisoning is an acute or chronic health hazard taking place as a person takes food containing naturally occurring poison or harmful substance (microbes or toxic substance causing the food poisoning).

The fool poisoning index is a ratio of a time period the food poison occurs at a specific temperature to a time period the food poison occurs at an optimum temperature.

The discomfort index is a numeral for expressing a level of discomfort of a person feels according to weather by combining a temperature and humidity. That is, the discomfort index is a numeral expressing a degree of sense of a temperature and humidity, also called as a temperature humidity index.

The discomfort index is the higher as the temperature and humidity is the higher, and, if the temperature is the same, the discomfort index is the higher as the humidity is the higher.

The putrefaction index is a numeral for expressing a level of putrefaction by combining the temperature and the humidity.

Because the putrefaction of substance is dependent on a very complicate chemical and biological process, though it is difficult to find out the real truth of the putrefaction of substance only with weather merely, of the factors that give influence to the putrefaction, the influence of the temperature and humidity is the greatest.

That is, a rate of the putrefaction is dependent on the temperature and humidity, and by expressing which with a numeral, the putrefaction index can be expressed.

However, the present home appliances used domestically only perform specified functions, but unable to provide the food poisoning index, the discomfort index, and the putrefaction index, failing to satisfy a code of healthy life the user desires.

Accordingly, an immediate development of a device for calculating well-being indices, such as the food poisoning index, the discomfort index, and the putrefaction index, and visibly providing the indices to the user.

SUMMARY OF THE INVENTION

Accordingly, the present invention is directed to an air conditioner that substantially obviates one or more problems due to limitations and disadvantages of the related art.

An object of the present invention is to provide an air conditioner which provides well-being indices, such as a food poisoning index, a discomfort index, and a putrefaction index for effective management of health of a user, and a room environment.

Another object of the present invention is to provide well-being indices by using an air conditioner having means for sensing a temperature and humidity without fail.

Another object of the present invention is to provide an air conditioner which positively expresses well-being indices related to a room temperature and humidity for user's easy notice.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an air conditioner includes a temperature sensor for sensing a room temperature, a control unit for controlling to calculate well-being indices according to the room temperature sensed at the temperature sensor with reference to well-being index calculating data stored already, and to present the well-being index calculated thus, and well-being index related information corresponding to the well-being index, and output means for presenting the well-being index calculated thus, and the well-being index related information corresponding to the well-being index under the control of the control unit.

The output means includes a display unit for displaying the well-being index, and the well-being index related information in a form of an image, and a voice output means for presenting the well-being index, and the well-being index related information in a form of voice.

Preferably, the air conditioner further includes an input unit for user's application of an order for presenting the well-being index, and the control unit controls to present the well-being index and the well-being index related information corresponding to the well-being index according to a user's order for presenting the well-being index.

The air conditioner further includes a storage unit having well-being index calculating data which is reference data for calculating the well-being index, and well-being index related information for each kind of well-being indices stored therein.

The well-being index is a food poisoning index of a room, and preferably, the well-being index related information is at least one kind of a level of the food poisoning, an estimated time period of putrefaction of food, and matters to be attended to, corresponding to the food poisoning index calculated thus.

In another aspect of the present invention, an air conditioner includes a temperature sensor for sensing a room temperature, a humidity sensor for sensing room humidity, a control unit for controlling to calculate well-being indices according to the room temperature or the room humidity sensed at the temperature sensor and the humidity sensor with reference to well-being index calculating data stored already, and to present the well-being index calculated thus, and well-being index related information corresponding to the well-being index, and output means for presenting the well-being index calculated thus, and the well-being index related information corresponding to the well-being index under the control of the control unit.

The output means includes one of a display unit for displaying the well-being index, and the well-being index related information in a form of an image, and a voice output means for presenting the well-being index, and the well-being index related information in a form of voice.

Preferably, the air conditioner further includes an input unit for user's application of an order for presenting the well-being index, and the control unit controls to present the well-being index and the well-being index related information corresponding to the well-being index according to a user's order for presenting the well-being index.

The well-being index is a food poisoning index calculated according to a room, and the well-being index related information is at least one kind of a level of the food poisoning, an estimated time period of putrefaction of food, and matters to be attended to, corresponding to the food poisoning index calculated thus.

The well-being index is a food poisoning index, and the air conditioner further includes a storage unit having food poisoning calculation data for each room temperature for calculating the food poisoning index, and food poisoning related information for each index stored therein.

The well-being index is a discomfort index calculated according to a room temperature and room humidity, and the well-being index related information is at least one of a level of discomfort corresponding to the discomfort index calculated thus, and user's countermeasure.

The well-being index is the discomfort index, and the air conditioner further comprises a storage unit having an equation defined taking a room temperature and room humidity as parameters for calculating the discomfort index, and discomfort index related information for each discomfort index stored therein.

The well-being index is the putrefaction index, and the well-being index related information is at least one of a level of putrefaction corresponding to the putrefaction index calculated thus, and matters to be attended to by the user.

The well-being index is the putrefaction index, and the air conditioner further includes a storage unit having an equation defined taking a room temperature and room humidity as parameters for calculating the putrefaction index, and putrefaction index related information for each index.

The well-being index includes a food poisoning index, a discomfort index, and a putrefaction index, and the air conditioner further includes an input unit for user's application of an order for presenting all of, or some of the food poisoning index, the discomfort index, and the putrefaction index.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
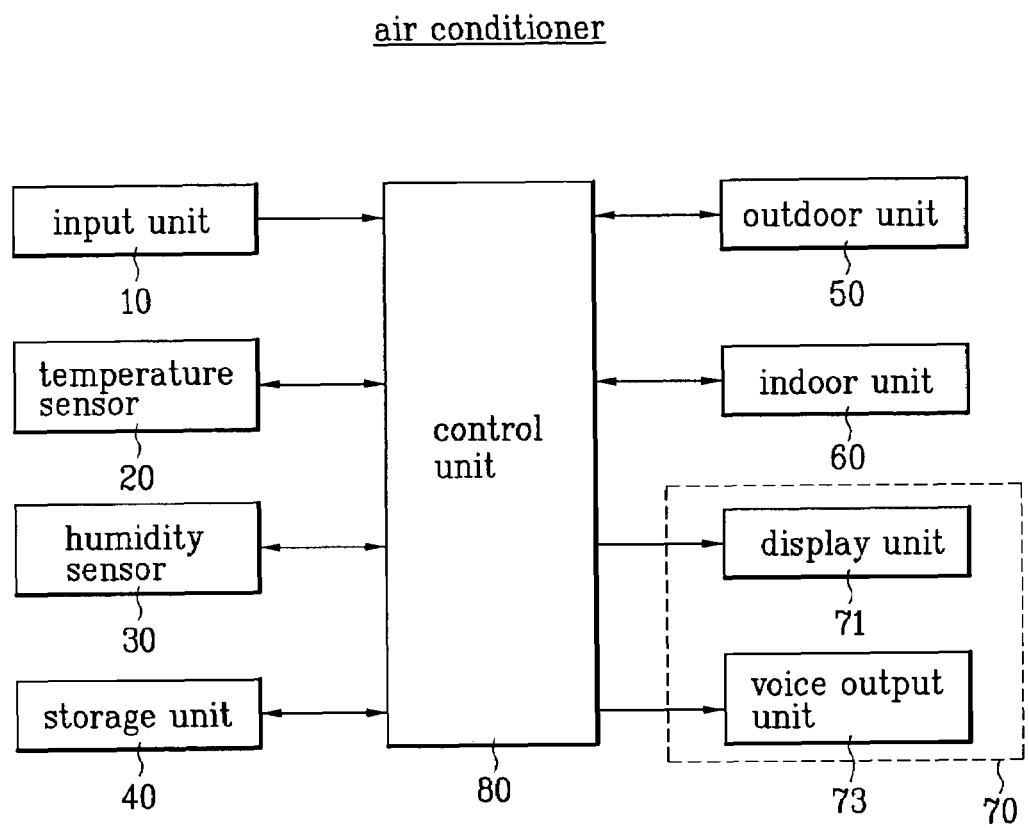
FIG. 1 illustrates a block diagram of an air conditioner for providing well-being indices in accordance with a preferred embodiment of the present invention.

FIG. 1 illustrates a block diagram of an air conditioner for providing well-being indices in accordance with a preferred embodiment of the present invention.

The present invention is characterized in that well-being indices (a poisoning index, a discomfort index, and a putrefaction index) related to a temperature and humidity are provided by using an air conditioner having means for sensing the temperature and the humidity without fail.

Referring to FIG. 1, the air conditioner includes a temperature sensor 20 for sensing a room temperature, a humidity sensor 30 for sensing room humidity, a control unit 80 for calculating well-being indices according to the room temperature and the room humidity sensed at the temperature sensor 20 and the humidity sensor 30 with reference to well-being index calculating data stored already, and controlling to forward the well-being indices calculated thus, and information on the well-being indices corresponding to the well-being indices, and an output means 70 for forwarding the well-being indices calculated thus, and the information on the well-being indices corresponding to the well-being indices.

Detailed description of an outdoor unit 50 and an indoor unit 60 which perform a specified function of the air conditioner will be omitted.

The temperature sensor 20 and the humidity sensor 30 are provided to a general air conditioner without fail, for measuring the temperature and the humidity to make a proper control of cooling/heating.

The output means 70 contains a display unit 71 for displaying an image signal, and a voice output unit 73 for presenting a voice signal, for visual, and/or auditory presentation of well-being indices, and well-being index related information corresponding to the well-being indices under the control of the control unit 80.

The display unit 71 can display characters, numerals, and graphics, and the voice output unit 73 can present a vocal information, or bell sound.

In general, the air conditioner has an input unit 10 for user's operation or application of order.

In the present invention, the input unit 10 further includes a key panel for applying user's order for providing the well-being indices.

Moreover, the input unit 10 enables not only output of the food poisoning index, the discomfort index, and the putrefaction index, but also input of output orders for the food poisoning index, the discomfort index, and the putrefaction index.

The present invention further includes a storage unit 40 having well-being index calculating data for calculating the food poisoning index, the discomfort index, and the putrefaction index, and well-being index related information on each of the food poisoning index, the discomfort index, and the putrefaction index stored therein.

The well-being index calculating data is a reference data or equation for calculating the food poisoning index, the discomfort index, and the putrefaction index taking the temperature and/or the humidity as parameters, and the well-being index related information is a level of food poisoning for each of food poisoning indices/estimated putrefaction time period/matters to be attended to, a level of discomfort for each of the discomfort indices/a countermeasure the user can take, and a level of putrefaction for each of putrefaction indices/matters to be attended to.

The storage unit 40 stores the temperatures sensed at the temperature sensor 20 and the humidity sensed at the humidity sensor at regular intervals under the control of the control unit 80. That is, the control unit 80 calculates averages of the temperatures and the humidities stored in the storage unit 40 as required, for using as parameters for calculating the well-being indices.

At first, the food poisoning index is fixed according to the room temperature sensed at the temperature sensor 20 with reference to the food poisoning data in a table 1 below.

TABLE 1

| Temperature (° C.) | Growth rate (hr$^{-1}$) | Growth time period (hr) | Food poisoning occur time period (hr) | Food poisoning index |
|---|---|---|---|---|
| 40 | 1.98 | 0.35 | 3.5 | 100 |
| 39 | 1.95 | 0.36 | 3.6 | 98 |
| 38 | 1.92 | 0.36 | 3.6 | 97 |
| 37 | 1.85 | 0.37 | 3.7 | 93 |
| 36 | 1.8 | 0.39 | 3.9 | 91 |
| 35 | 1.7 | 0.41 | 4.1 | 86 |
| 34 | 1.6 | 0.43 | 4.3 | 81 |
| 33 | 1.45 | 0.48 | 4.8 | 73 |
| 32 | 1.35 | 0.51 | 5.1 | 68 |
| 31 | 1.2 | 0.58 | 5.8 | 61 |
| 30 | 1.05 | 0.66 | 6.6 | 53 |
| 29 | 1 | 0.69 | 6.9 | 51 |
| 28 | 0.9 | 0.77 | 7.7 | 45 |
| 27 | 0.8 | 0.87 | 8.7 | 40 |
| 26 | 0.7 | 0.99 | 9.9 | 35 |
| 25 | 0.6 | 1.16 | 11.6 | 30 |
| 24 | 0.55 | 1.26 | 12.6 | 28 |
| 23 | 0.475 | 1.46 | 14.6 | 24 |
| 22 | 0.4 | 1.73 | 17.3 | 20 |
| 21 | 0.35 | 1.98 | 19.8 | 18 |
| 20 | 0.25 | 2.77 | 27.7 | 13 |
| 19 | 0.2 | 3.47 | 34.7 | 10 |
| 18 | 0.18 | 3.85 | 38.5 | 9 |
| 17 | 0.15 | 4.62 | 46.2 | 8 |
| 16 | 0.12 | 5.78 | 57.8 | 6 |
| 15 | 0.1 | 6.93 | 69.3 | 5 |

Above food poisoning indices are defined in four grades according to magnitudes thereof as shown in the following table 2, by using which the food poisoning related information, such as a level of the food poisoning, estimated putrefaction time period, matters to be attended to, and so on is fixed in correspondence to the grade of the food poisoning index calculated thus.

TABLE 2

| Index range | Matters to be attended to |
|---|---|
| Over 86 | Putrefaction within 3-4 hours, extreme payment of attention to food handling, food poisoning hazard |
| 50-85 | Putrefaction within 4-6 hours, pay attention to handling of cooking equipment, alert against food poisoning |
| 35-50 | High probability of occurrence of food poisoning within 3-4 hours, pay attention to food poisoning |
| 10-35 | High probability of occurrence of food poisoning, pay attention to food handling |

Next, the discomfort index can be calculated with an equation defined as the following equation (1) by applying the temperature and the humidity sensed at the sensor 20 and the humidity sensor 30 thereto, respectively.

$$DI = 9/5 Ta - 0.55(1-RH)(9/5 Ta - 26) \pm 32 \quad (1)$$

Where, Ta denotes a dry bulb temperature ° C., and RH denotes relative humidity.

The discomfort index is defined in 6 grades as the following table 3 according to magnitudes thereof as shown in the following table 3, by using which discomfort index related information, such as the level of discomfort for the grade of the discomfort index calculated thus, the countermeasure the user can take for resolving the discomfort (not shown), and so on is fixed.

TABLE 3

| DI | ° C. | Level of discomfort |
|---|---|---|
| Below 68 | Below 20 | Every body is comfortable |
| 70 | 21 | People show discomfort |
| 75 | 24 | Around 10% of people are uncomfortable |
| 80 | 26.5 | Around 50% of people are uncomfortable |
| 83 | 28.5 | Every body is uncomfortable |
| 86 | 30.0 | Very uncomfortable |

Next, the putrefaction index can be calculated with an equation defined as the following equation (2) by applying the temperature and the humidity sensed at the sensor 20 and the humidity sensor 30 thereto, respectively.

$$DI = \frac{(H-65)(1.054)^t}{14} \quad (2)$$

Where, H denotes a daily average of the relative humidity % sensed at the humidity sensor 30, and 't' denotes a daily average of the temperatures ° C. sensed at the temperature sensor 20.

Above putrefaction indices are defined in three grades according to magnitudes thereof as shown in the following table 4, by using which the putrefaction related information, such as a level of the putrefaction, matters to be attended to, and so on is fixed in correspondence to the grade of the putrefaction index calculated thus.

TABLE 4

| Putrefaction index | level |
| --- | --- |
| 0~3 | a low level of putrefaction |
| 3~7 | an ordinary level of putrefaction |
| 7~10 | a high level of putrefaction |

That is, by using the well-being index calculating data (table 1, equations 1 and 2) and the well-being index related information (table 2, 3, and 4) stored in the storage unit 40, the well-being indices, and information related thereto is fixed with reference to the room temperature and humidity.

Such well-being indices and related information is presented as an image and/or voice through the output means 70 under the control of the control unit 80.

The control unit 80 may present the well-being indices themselves calculated by using the well-being index calculating data, or the well-being index related information together with the grade corresponding to the well-being index calculated thus.

A method for presenting a well-being index by using the foregoing air conditioner of the present invention will be described.

Figure 2:
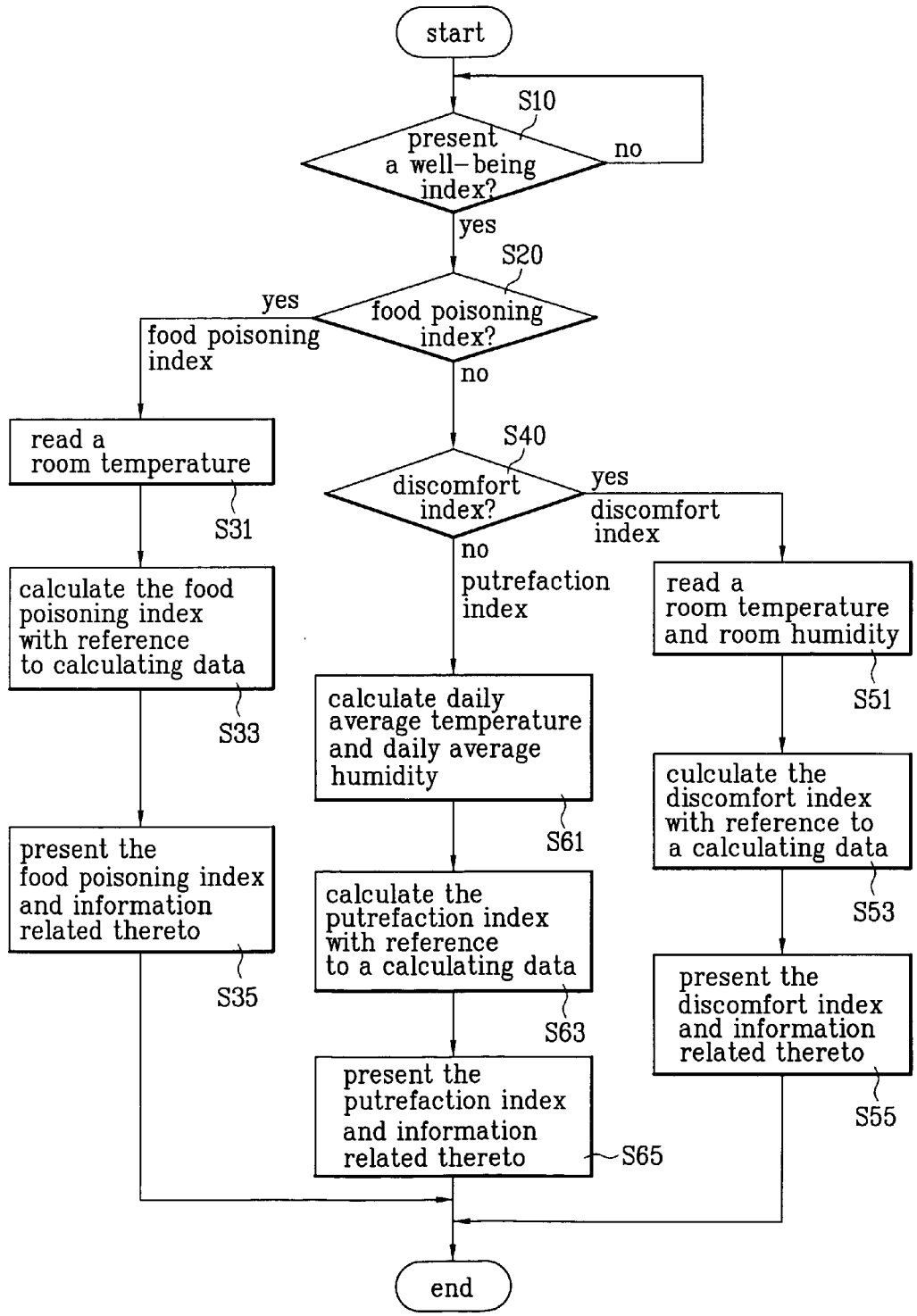
FIG. 2 illustrates a flow chart showing the steps of a method for calculating well-being indices with an air conditioner in accordance with a preferred embodiment of the present invention.

A method for presenting a well-being index will be described for each of the food poisoning index, the discomfort index, and the putrefaction index, with reference to FIG. 2.

If the user gives order for presenting a well-being index (S10), the control unit 80 determines whether the user's order for presenting the well-being index is an order for presenting 'a food poisoning index' or not (S20).

As a result of determination (S20), if the user's presenting order is for the 'food poisoning index', the control unit 80 reads the room temperature sensed at the temperature sensor 20 at the present time (S31).

Then, the control unit 80 calculates the food poisoning index according to the room temperature read thus with reference to the food poisoning index calculating data (table 1) stored in the storage unit 40 (S33).

Along with this, the control unit 80 reads related information corresponding to the food poisoning index calculated thus from the food poisoning indices (table 2) stored in the storage unit 40, and presents the food poisoning index calculated thus and related information corresponding thereto to the output means 70 (S35).

In the meantime, as a result of determination (S20), if the user's presenting order is not for the 'food poisoning index', the control unit 80 determines if the user's presenting order is for the 'discomfort index' (S40).

If the user's order for presenting a well-being index is for the 'discomfort index', the control unit 80 reads the present room temperature and humidity from the temperature sensor 20 and the humidity sensor 30 (S51).

Then, the control unit 80 calculates the discomfort index with the equation for calculating a discomfort index stored in the storage unit 40 (equation 1) according to the room temperature and the room humidity read thus (S53).

Along with this, the control unit 80 reads related information corresponding to the discomfort index calculated thus from the discomfort indices (table 3) stored in the storage unit 40, and presents the discomfort index calculated thus and related information corresponding thereto to the output means 70 (S55).

In the meantime, as a result of determination (S40), if the user's presenting order is not for the 'food poisoning index', but for the putrefaction index, the control unit 80 calculates a daily average humidity 'H' and a daily average temperature 't' required for calculation of the putrefaction index by using the humidity values and the temperature values stored in the storage unit 40 (S61).

The daily average humidity 'H' and the daily average temperature 't' is applied to the putrefaction calculating equation (equation 2) stored in the storage unit 40, to obtain the present putrefaction index (S63).

Along with this, the control unit 80 reads related information corresponding to the putrefaction index calculated thus from the putrefaction index related information (table 4) stored in the storage unit 40, and presents the putrefaction index and the related information corresponding thereto to the output means 70 (S65).

In the meantime, if the user applies an order for presenting all of the food poisoning index, the discomfort index, and the putrefaction index, the control unit 80 calculates each of the well-being indices by methods identical to above, and presents the well-being indices and information related thereto to the output means 70.

Thus, the air conditioner of the present invention can measure the temperature and the humidity required for calculating the well-being indices of the food poisoning index, the discomfort index, and the putrefaction index by using the temperature sensor 20 and the humidity sensor 30, which are means for measuring a temperature and humidity for an appropriate control of the outdoor unit 50 and the indoor unit 60.

That is, without any extra provision, the well-being indices can be calculated, and information related thereto can be provided by using an air conditioner which is provided to a house of an office without exception.

As has been described, the air conditioner of the present invention has the following advantages.

The presentation of various well-being indices related to a temperature and humidity permits to provide living information for effective management of individual heath, and room environment.

The visual and/or auditory presentation of the food poisoning index, the discomfort index, and the putrefaction index permits the user to notice well-being indices, readily.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An air conditioner comprising:
a temperature sensor for sensing a room temperature;
a storage unit storing a look-up table having a plurality of categories;
a control unit for calculating a food poisoning index according to the room temperature sensed at the temperature sensor, the control unit corresponding the food poisoning index to one of the categories based on a magnitude of the food poisoning index, each of the categories of the look-up table including information of at least food poisoning level, an estimated time period of putrefaction of food, and matters to be attended to corresponding to the calculated food poisoning index; and
output means for presenting the food poisoning index and the information of the corresponding one of the categories of the look-up table.

2. The air conditioner as claimed in claim 1, wherein the output means includes a display unit for displaying the food poisoning index and the information of the corresponding one of the categories of the look-up table in a form of an image.

3. The air conditioner as claimed in claim 1, wherein the output means includes a display unit for displaying the food poisoning index and the information of the corresponding one of the categories of the look-up table in a form of voice.

4. An air conditioner comprising:
   a temperature sensor for sensing a room temperature;
   a humidity sensor for sensing room humidity;
   a control unit for calculating a food putrefaction index based on the room temperature sensed by the temperature sensor and the room humidity sensed by the humidity sensor, and for corresponding the food putrefaction index to one of pre-stored food putrefaction levels based on a magnitude of the food putrefaction index; and
   output means for presenting the food putrefaction index and the corresponding one of the pre-stored food putrefaction levels under control of the control unit.

5. The air conditioner as claimed in claim 4, wherein the output means includes a display unit for displaying the food putrefaction index and the corresponding one of the pre-stored levels in a form of an image.

6. The air conditioner as claimed in claim 4, wherein the output means includes voice output means for presenting the food putrefaction index and the corresponding one of the pre-stored levels in a form of voice.

7. The air conditioner as claimed in claim 4, wherein the air conditioner further comprises a storage unit storing a first look-up table, the control unit further calculating a food poisoning index based on the first look-up table, the first look-up table mapping the room temperature to a value representing the food poisoning index corresponding to the room temperature.

8. The air conditioner as claimed in claim 7, wherein the storage unit stores a second look-up table having a plurality of categories, the control unit corresponds the food poisoning index to one of the categories based on a magnitude of the food poisoning index, each of the categories of the second look-up table including information of at least a food poisoning level, an estimated time period of putrefaction of food, and matters to be attended to, the output means presenting the food poisoning index and the information of the corresponding one of the categories of the second look-up table.

9. The air conditioner as claimed in claim 8, wherein the control unit further calculates a discomfort index based on the room temperature and the room humidity, the storage unit storing a third look-up table having a plurality of categories, the control unit corresponds the discomfort index to one of the categories based on a magnitude of the discomfort index, each of the categories of the third look-up table including information of at least a discomfort level and a user's countermeasure, the output means presenting the discomfort index and the information of the corresponding one of the categories of the third look-up table.

10. The air conditioner as claimed in claim 9, further comprising an input unit for user's application of an order for presenting at least one of the food poisoning index, the discomfort index and the food putrefaction index, and the control unit controls to present at least one of the food poisoning index with the information of the corresponding one of the categories of the second look-up table, the discomfort index the information of the corresponding one of the categories of the third look-up table, and the food putrefaction index with the corresponding one of the pre-stored food putrefaction levels according to the order.

11. The air conditioner as claimed in claim 9, wherein the control unit calculates the discomfort index only based on the room temperature sensed by the temperature sensor and the room humidity sensed by the humidity sensor.

12. The air conditioner as claimed in claim 4, wherein the control unit calculates the food putrefaction index based on a daily average of the room temperature sensed by the temperature sensor and a daily average of the room humidity sensed by the humidity sensor.

13. The air conditioner as claimed in claim 12, wherein the control unit calculates the food putrefaction index only based on the daily average of the room temperature sensed by the temperature sensor and the daily average of the room humidity sensed by the humidity sensor.

* * * * *